UNITED STATES PATENT OFFICE.

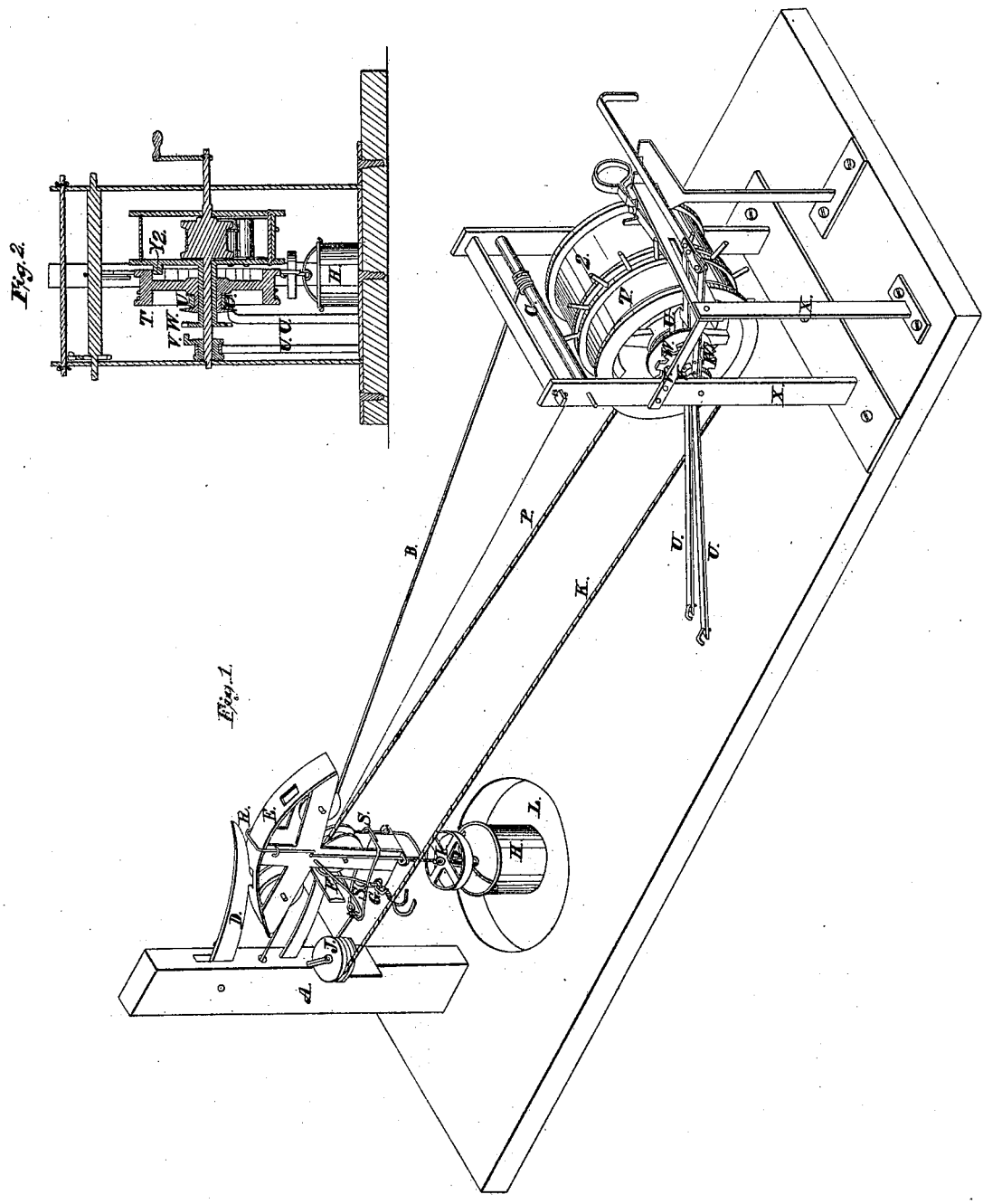
Z. Swope
Windlass Water Elevator,
Nº 7,128.
Patented Feb. 26, 1850

ZURIEL SWOPE, OF LANCASTER, PENNSYLVANIA.

HYDROLATOR.

Specification of Letters Patent No. 7,128, dated February 26, 1850.

*To all whom it may concern:*

Be it known that I, ZURIEL SWOPE, of Lancaster city, State of Pennsylvania, have invented an Improvement on the Improved "Hydrolator," which I call the "Improved Hydrolator and Raising and Conveying Power;" and I do hereby declare that the following is a full, clear, and exact description thereof, reference being had to the annexed drawings, making a part of this specification, in which—

Figure 1 is a perspective view of the machine and Fig. 2 is a vertical transverse section thereof.

The nature and object of my invention is to first elevate and then to carry water, or materials for a distance upon a single or double cord or wire, and I will proceed to describe its construction and operation.

Figure 1 represents the improved hydrolator and single geared raising and conveying power with a single rope or wire.

A represents the the post to which the rope or wire B is fastened, and extended to and coiled around the windlass C having a ratchet on one end; D, the hook to hold the carrier E when it reaches its destination by the aperture in the top of the carrier E; F, the arm extending from the post to press back the top of the hook G and unhook the ring I and allow it to descend with the bucket H or barrel box or thing thereto attached; J, the pulley over which the cord K runs; L, represents the well or space through which the ring I with the bucket H or thing attached descends and ascends.

O is a spring hook attached to the center of the ring I and is intended to secure the handle of the bucket H or box or thing attached underneath and together with the ring I is fastened to the cord P extending upward through the carrier E and thence to the wheel Q and coiled around the windlass within. The ring I when the carrier is to return is raised by the cord P and presses up the slide R which acts against the hook D, which disconnects it from the carrier E and sets it free to run up the incline plane.

I represents a ring with arms running from its center and hook and spring O on the lower part and fastened in the center and having a small ring above; S, the wire passing round the carrier E to which the cord K is attached, which cord K extends to the wheel T.

U, U, the sliding levers. The outside lever shifts right and left to give security to or assist in fastening the detent or catch V to the detent wheel W so as to operate upon the wheels Q and T and fix them firmly to the shaft when starting off and sending out the carrier E, which detent wheel W is fastened to the cylinder extending through the center of the wheel T, to the wheel Q. The inside lever is attached to the wheel T so as to shift it off from the wheel Q, at any time for the purpose of regulating the cord K in changes of weather to tighten or slacken the cord K, and also to separate the wheel T and Q so as to allow the wheel Q to give length to the cord P so as to take or carry the bucket H to any further distance required; X, the frame to support the levers wheels &c.; T, the wheel with flanges and four arms on the inside extending from the hub, and pins projecting from the periphery of one of the flanges at equal distances apart, by which the wheel T may be shifted and separated with the inside lever U, from the wheel Q, and stopped by the upper arm of the inside lever U, so as to allow the cord P to be slackened or uncoiled. This wheel T has a round hole through the center of the hub, and works clear of the shaft resting upon a cylinder, the shaft passing through its center, but is held firmly to the wheel Q, by the inside lever U, and connected by a strong pin Y, which fits in between cogs or holes in the inside of the wheel T; Q, the wheel with a flange and four arms at each side, having the windlass in the center upon which the cord P is coiled, and uncoiled when the ring I with the bucket or thing atached descends and ascends into, and out of, the well or space L.

At starting, the drums Q and T, are connected to each other and are both made fast to the crank shaft; by turning the crank shaft therefore, the cord K, will be wound around the drum T, and the cord P will be unwound from the drum Q, thus causing the conveyer E to be drawn along the wire B, to the end thereof which is immediately over the well or spring; the drums Q, and T, are then both disconnected from the crank shaft, and they are prevented from rotating by throwing the horizontal portion of the inner lever U, between the radial arms projecting from T, during the revolutions of the crank shaft that may be required to enable the bucket to descend into the well or spring and be elevated again above the same, by unwinding the rope P, from the crank shaft, within the drum Q, and winding it up again. The bucket (or its equivalent) having been thus filled and elevated above the well or spring, the drums Q, and T, are again made fast to the crank shaft, and the inner lever U, is thrown out from between the radial arms of the drum T, when by turning the crank shaft, motion will be imparted to the drums Q and T, causing the rope P, to be wound around the drum Q, and the rope K, to be unwound from the drum T, by means of which the conveyer E, and the bucket H, suspended thereto, will be drawn to the place from which they departed, with the bucket filled.

It will therefore be perceived that the bucket H, will be conveyed over the tension wire B, at an accelerated speed and a diminished leverage, and be let into and drawn out of the well or spring, at a slower movement and an increased leverage; thereby enabling a person to elevate and convey a much larger quantity of water by the aid of my hydrolator, than can be eccomplished with any other apparatus that has ever been brought into use.

I am aware that an elevating rope has been passed through an opening in a windlass drum and confined to the shaft within the same for the purpose of enabling the length of the rope to be regulated as circumstances might require; and therefore, I do not claim this as my invention; but What I do claim as new and desire to secure by Letters Patent, is—

The combining with a hydrolator (for first elevating water—or other substance—and then conveying the same to a distance) a double acting drum constructed substantially as herein described in such a manner that the vertical raising and lowering movement of the bucket—or its equivalent—may be at a slow movement and an accelerated leverage, and the horizontal or inclined conveying movement may be at an accelerated speed and a diminished leverage.

ZURIEL SWOPE.

Witnesses at signing:
W. T. AMWEG,
J. FRANKLIN REIGARD.